United States Patent [19]

Tagawa

[11] Patent Number: 5,714,282
[45] Date of Patent: Feb. 3, 1998

[54] COATING PASTE AND A NONAQUEOUS ELECTRODE FOR A SECONDARY BATTERY

[76] Inventor: Kazuo Tagawa, 397-3 Kuroda, Hannan-shi, Osaka-hu, 599-02, Japan

[21] Appl. No.: 652,312

[22] Filed: May 23, 1996

[30] Foreign Application Priority Data

May 23, 1995 [JP] Japan ................. 7-161340
May 23, 1995 [JP] Japan ................. 7-161341

[51] Int. Cl.$^6$ ................. H01M 4/62
[52] U.S. Cl. ................. 429/217; 462/218; 462/194; 462/191; 462/192
[58] Field of Search ................. 429/191, 194, 429/218, 217, 192; 29/623.3

[56] References Cited

U.S. PATENT DOCUMENTS

| | | | |
|---|---|---|---|
| 5,399,447 | 3/1995 | Chaloner-Gill et al. | 429/191 |
| 5,415,958 | 5/1995 | Takahashi et al. | 429/217 |
| 5,429,891 | 7/1995 | Gozdz et al. | 429/191 |
| 5,496,656 | 3/1996 | Inamasu et al. | 429/57 |
| 5,498,492 | 3/1996 | Hara et al. | 429/212 |
| 5,565,284 | 10/1996 | Koga et al. | 429/218 |

*Primary Examiner*—Stephen Kalafut
*Assistant Examiner*—Carol Chaney

[57] ABSTRACT

A coating paste for a nonaqueous electrode for a secondary battery comprising a metal film such as aluminum, coated with a viscous fluid dispersant made by adding propylene tetrafluoroethylene copolymer and/or propylene tetrafluoroethylene vinylidene fluoride terpolymer as the binder and an electrode active material.

20 Claims, No Drawings

A coating paste and a nonaqueous electrode for a secondary battery

COATING PASTE AND A NONAQUEOUS ELECTRODE FOR A SECONDARY BATTERY

FIELD OF THE INVENTION

The invention relates to a coating paste for a nonaqueous electrode for a secondary battery containing fluoropolymers such as propylene tetrafluoroethylene copolymers, terpolymers of propylene-tetrafluoro-ethylene-vinylidene fluoride, copolymers emulsified or dispersed in water, a carboxymethyl cellulose group, a polyacrylic acid group and a battery active material.

BACKGROUND OF THE INVENTION

Progress in electronic appliances has been active in recent years, and miniaturization and weight reduction of portable electronics have been rapidly progressing. The batteries for these appliances are required to have high energy density, which enables the battery to be reduced in size and weight. Particularly, as a nonaqueous secondary battery, a secondary battery which uses lithium or lithium alloy as its negative electrode and an electrolyte impregnated solid electrolyte and a lithium-ion secondary battery which uses a carbon material in its negative electrode have been gathering attention. The nonaqueous secondary battery tends to be used as a power supply for electronics with a larger power consumption, and the surface area of the electrode must be enlarged by making the electrode as a thin film.

Conventionally, an electrode was manufactured by press forming battery active material powder with a powder binder such as Teflon powder, or polyethylene powder. However, it is difficult to produce a thin electrode with a large surface area. One suggested method of producing an electrode is to coat a metal film, which is a current collector, with butadiene base rubber or EPDM rubber as a latex dispersed in an organic dispersion solution or water after dispersing it with the addition of battery active material powder. This method has an advantage in that a thin electrode with a large surface area can be easily obtained according to this method. On the other hand, the binder made of an insulative material used as the electrode in a battery would cause a substantial over-voltage if the adhesion to the metal film is increased, thus unsatisfactory as a product. Polyvinylidene fluoride (PVDF) has been suggested to be the solution to the problem. However, the boiling points of N-methyl pyrrolidione, dimethylacetamide, hexamethylphosphoramide, dimethylsulfoxide, etc. are high as the solvent, and the polarity is high as well. If they remain in the battery, adverse effects to the battery can be expected, and some of them are highly toxic. Propylene containing fluoropolymers such as vinylidene fluoride, hexafluoropropylene and tetrafluoride can be dissolved easily in a standard coating solvent, and it becomes a stable binder solvent. Thus, they could cause the battery capacity reduction when left unused in a typical electrolyte such as propylene carbonate, 2-methyltetrahydrofuran, or y-butyrolactone in the battery at 45° to 60° C. or higher, which could cause the battery capacity reduction when left unused.

As previously described, currently there is no method of coating and adjusting an electrode which satisfied the following criteria:

1. Relatively low boiling point of solvent, and easy to dry;
2. Low toxicity;
3. Low cost solvent; and
4. Fully functional as an electrode in actual use.

It is an object of the present invention to solve the problems described above, and provide a coating material for and a nonaqueous electrode for a secondary battery of a superior battery performance through a simplified manufacturing method for an electrode using an industrial coating process.

One embodiment of the present invention is characterized by a coating paste for an electrode which is an aqueous dispersible material containing 98.5–85 wt % of battery active material; 0.1–13 wt % of propylene containing fluoropolymer, which is a copolymer made of propylene and tetrafluoroethylene and/or copolymer made of propylene, tetrafluoroethylene and vinylidene fluoride; 0.2–2 wt % of a carboxymethyl cellulose group; and 0.1–0 wt % of polyacrylic acid group, all on the weight of the paste. A solvent no longer is needed due to an aqueous dispersion fluid made by dispersing or emulsifying the copolymer made of propylene and tetrafluoroethylene into water. Paste with appropriate viscosity for coating is made by mixing a solution of a carboxymethyl cellulose group and a polyacrylic acid group with the battery's active material powder, and an electrode can be easily and safely made by evaporating water in an industrial coating process. This electrode shows an extremely low expansion rate toward the electrolyte, and has superior battery performance.

The active material used in the battery is not limited to a certain type. Samples of the active materials are metal oxide such as $MnO_2$, $V_2O_5$, $V_2O_{13}$, metal sulfite such as $TiS_2$, $MoS_2$, FeS, $LiCoO_2$, $LiNiO_2$, $LiMnO_4$, a positive electrode active material such as lithium composite metal oxide having a transition metal such as Ni, Mm, Fe and Ti as the main ingredients, and negative electrode materials such as coke, graphite, mesophase-pitch small spherical, carbonized materials, phenol resin, polyparaphenylene, and carbon fiber.

Preferably, the average particle size of the battery active material used in the present invention should be between 1–50 mm, preferably between 3–20 mm. The propylene containing fluoropolymers can be obtained through radical polymerization of propylene and tetrafluoroethylene or propylene, tetrafluoroethylene and vinylidene fluoride as the main ingredients using emulsifier and/or dispersant. The carboxymethyl cellulose family of the present invention is carboxymethyl cellulose (Li, Na, K, $NH_4$) or a mixture of one of those with one or more of the following: methyl cellulose, ethyl cellulose, hydroxymethyl cellulose, polyvinyl alcohol, starch oxide or phosphated starch. The polyacrylic oxide group of the present invention refers to a water soluble polymer capable of copolymerization having either a polymer such as polyacrylic acid, polyacrylic acid salt (Li, Na, K, $NH_4$), methacrylic acid, itaconic acid and maleic acid or their salt counter parts, and polyacrylic acid (salt), metacryl acid (salt), itaconic acid (salt) and maleic acid (salt). If necessary, a phosphate dispersant such as sodium pyrophosphate, a non-ion family surfactant such as a nonyl phenol ethylene oxide additive or an anion family surfactant such as sodium lauryl sulfate can be added.

An aqueous dispersant of the propylene containing fluoropolymer, a water solution of the carboxymethyl cellulose and a water solution of the polyacrylic group are mixed at a predetermined ratio to make a coating paste of the present invention. A standard agitator can be used.

The aqueous dispersant contains 98.5–85 wt % of battery active material, 0.1–13 wt % of a propylene fluoride group copolymer, which is a copolymer made of propylene and tetrafluoroethylene and/or terpolymer made of propylene, tetrafluoroethylene and vinylidene fluoride, 0.2–2 wt % of a carboxymethyl cellulose group, and 0–1.0 wt % of a polyacrylic acid group. A metal film such as aluminum, nickel, stainless steel and copper, mesh metal and metal porous material preferably 1 mm to 100 mm in thickness can be used as the metal film for the current collector of the present invention. The coating paste is spread onto the metal foil in a desired method such as a doctor blade method, various coater methods and gravure coating method, and dried to produce a non-aqueous electrode for a secondary battery. If necessary, a press can be used. The present invention is characterized by the coating paste for an electrode which is an aqueous dispersible material containing 98.5–85 wt % of battery active material, 0.1–13 wt % of propylene-fluoride group copolymer, which is a copolymer made of propylene and tetrafluoroethylene and/or terpolymer made of propylene, tetrafluoroethylene and vinylidene fluoride, 0.2–2 wt % of a carboxymethyl cellulose group, and 0–1.0 wt % of polyacrylic acid group. When the battery active material exceeds 98.5 wt %, bonding to the condenser worsens, and reduces the charge/discharge cycle life. On the other hand, the capacity per volume as a battery is not favorable at below 85 wt %.

Examples of the electrolytic solutions are non-proton organic solvent mediums, such as propylene carbonate, ethylene carbonate, dimethyl carbonate, ethyl methyl carbonate, diethyl carbonate, δ-butyrolactone and diethoxyethane, and the electrolytes are lithium salt such as $LiClO_4$, $LiBF_4$, $LipF_6$, $LiAsF_5$, $CF_3SO_3Li$, $(CF_3SO_2)_2$, NLi for electrolyte. The electrode in the present invention can be used in a battery of any shape such as the cylindrical, sheet-type or rectangular type.

The following are exemplary applications of the present invention. However, the applications for the electrode of the present invention are not limited to these examples.

EXAMPLE 1

98.0 weight parts of needle coke of 10 mm in average particle diameter was mixed with a solution which was prepared by mixing 3.6 weight parts of copolymer of latex propylene, tetrafluoroethylene (molar ratio of 44:55) and 31.4 wt % solid, 95.0 weight parts of carboxymethyl cellulose aqueous solution (0.895 wt %) and 0.22 weight parts of polyacrylic oxide solution (10 wt % solid). This solution was spread onto the rough surface of a copper foil having a thickness of 12 mm. This was dried at 110° C. The thickness of the resulting dried film was 95 mm. A 1.5 cm×2.0 cm cut piece is used as a negative electrode.

EXAMPLE 2

Premixed 95 weight parts of $LiCoO_2$ of 8 mm in average particle diameter, acetylene black 0.5 weight parts and graphite powder 6.0 weight part was mixed into a premixed solution consisting of terpolymer latex (32.2 wt % solid) 3.5 weight parts consisting of propylene, tetrafluoroethylene and vinylidene fluoride (molar ratio of 25:40:35), sodium carboxymethyl cellulose 0.9 wt %, a polyacrylic acid solution (10 wt % solid), and stirred. This solution was spread onto the primed surface of an aluminum foil having a thickness of 15 mm with a toluene solution consisting of acetylene black and carboxyl modified rubber. This was dried in a dryer at 120° C. The thickness of the film was 125 mm. A 1.5 cm×2.0 cm cut piece is used as a positive electrode.

EXAMPLE 3

98 weight parts of artificial graphite of 5 mm in average particle diameter was added while stirring to a solution which was prepared by mixing a 3.6 weight parts of copolymer of propylene, tetrafluoroethylene (molar ratio of 45:55), (31 wt % solid), 94.4 weight parts of sodium carboxymethyl cellulose (0.895 wt %) and 0.22 weight part of poly acrylic acid solution (10 wt % solid). This solution was spread onto the rough surface of a copper foil having a thickness of 12 mm. The thickness of the resulting film was 95 mm. This was dried at 110° C. A 1.5 cm×2.0 cm cut piece is used as a negative electrode.

EXAMPLE 4

Premixed 91.5 weight parts of $LiMn_2O_2$ of 15 mm in average particle diameter, acetylene black 0.5 weight part and graphite powder 6.0 weight part was mixed into a premixed solution consisting of terpolymer latex (32.3 wt % solid) 3.5 weight parts with a composition of propylene, tetrafluoroethylene and vinylidene fluoride (molar ratio of 25:40:35), 95.0 weight parts of sodium carboxymethyl cellulose (0.9 wt %), a polyacrylic acid solution (10 wt % solid), and stirred. This solution was spread onto the surface of an aluminum foil having a thickness of 15 mm identical to Sample 2. This was dried in a dryer at 120° C. The thickness of the film was 115 mm. A 1.5 cm×2.0 cm cut piece is used as a positive electrode.

COMPARATIVE EXAMPLE 1

96 weight parts of needle coke the same as in Example 2 was mixed and stirred with a pre-dissolved solution of 4 wt % polyvinylidene in 96 weight parts of N-methyl-2-pyrrolidione. This solution was applied as a 90 mm thick film onto the rough surface of a 12 mm thick copper foil, and dried in a dryer at 160° C. This film was cut to make a 1.5 cm×2.0 cm negative electrode.

COMPARATIVE EXAMPLE 2

96 weight parts of the premixed $LiCoO_2$, acetylene black and black graphite powder, the same as in Example 2, was mixed and stirred with 4 weight parts of polyvinylidene and 96 weight parts of N-methyl-2-pyrrolidione. This solution was applied on a 15 mm aluminum foil of a rough surface using a doctor blade, and dried in a dryer at 160° C. The film thickness was 130 mm. This film was cut to make a 1.5 cm×2.0 cm positive electrode. An ethyl methyl carbonate-ethylene carbonate (volume ratio 3:1) battery was made with a counter electrode made of copper net with a lithium metal foil compressed, all used in Examples 1–4 and Comparative Examples 1–2, with a porous polyethylene separator (25 μm) and a 1M$LiP_6$ electrolyte. Over-voltage of this battery was measured. The discharge capacity on the 10th charge/discharge cycle against that of the first cycle, the capacity retention rate, was calculated. The results are shown in Table 1.

TABLE 1

| | Battery active material wt % | Propylene containing fluro-polymer | Carboxy-methyl cellulose wt % | Poly-acrylic oxide group | Voltage | Capacity retention rate on 10th cycle % |
|---|---|---|---|---|---|---|
| Example 1 | Needle coke 98.0 | propylene, tetrafluoro ethylene 1.13 | Carboxy-methyl cellulose Li 0.85 | Poly-acryclic acid 0.02 | 0.03 | 98 |
| Example 2 | $LiCoO_2$ 91.5 | propylene, tetrafluoro ethylene and vinylidene fluoride 1.13 | Carboxy-methyl cellulose Na 0.85 | Poly-acryclic acid 0.02 | 0.04 | 97 |
| Example 3 | Artificial graphite 99.0 | propylene, tetrafluoro ethylene 1.13 | Carboxy-methyl cellulose Li 0.85 | Poly-acryclic acid 0.02 | 0.04 | 98 |
| Example 4 | $LiMnO_4$ 91.5 | propylene, tetrafluoro ethylene and vinylidene fluoride 1.13 | Carboxy-methyl cellulose Na 0.85 | Poly-acryclic acid 0.02 | 0.04 | 96 |
| Comparative Example 1 | Needle Coke 96.0 | Vinylidene Fluoride 4.0 | N/A | N/A | 0.10 | 94 |
| Comparative Example 2 | $LiCoO_2$ 96.0 | Vinylidene Fluoride 4.0 | N/A | N/A | 0.13 | 92 |

Effectiveness of the Invention

The electrodes made of the coating material of the subject invention as disclosed in the above Examples have a small over-voltage as shown in Table 1. These electrodes can provide a highly practical nonaqueous secondary battery.

Another embodiment of the present invention is characterized by a nonaqueous electrode for a secondary battery consisting of a battery active material, a binder and a metal foil, and the binder consists of either a copolymer of propylene and tetrafluoroethylene or a terpolymer of propylene, tetrafluoroethylene and vinylidene fluoride. The copolymer consists of a conventional coating solvent such as ethyl acetate, methyl ethyl ketone and methyl methyl isobutyl ketone (hexone) mixed with a binder dissolved up to the allowable concentration, if necessary, such as ethyl cellosolve and methyl cellosolve. A viscous fluid dispersant sufficient for coating is made by adding the previously described solvent to the solution, then mixing it with battery active material powder using the copolymer of the present invention. There is no specific amount of the binder to be used, but the range should be between 1 to 20 weight parts, preferably 2 to 8 weight parts, for 100 weight parts of the battery active material. Polymer molecules dissolvable in the common solvents can be used if necessary.

The following are exemplary applications of the present invention relating to the electrode. However, the applications for the electrode of the present invention are not limited to these examples.

EXAMPLE 10

A solution prepared by adding 18 weight parts of ethyl cellosolve to premixed 91.5 weight parts of $LiCoO_2$ of 8 mm in average particle diameter, 0.5 weight parts of acetylene black and 6.0 weight parts of graphite powder and 2 weight parts of terpolymer consisting of propylene, tetrafluoroethylene and vinylidene fluoride (molar ratio of 25:40:35) after they were dissolved in 24 weight parts of ethyl acetate and 5 weight parts of methyl isobutyl ketone was stirred. This solution was spread onto the rough surface of an aluminum foil having a thickness of 15 mm with a doctor blade. This was dried in a dryer at 120° C. The thickness of the film was 120 mm. A 1.5 cm ×2.0 cm cut piece is used as a positive electrode.

EXAMPLE 20

96 weight parts of needle coke of 10 mm in average particle diameter was mixed with a solution in which 4 weight parts of copolymer of propylene and tetrafluoroethylene (molar ratio of 45:55) were mixed with 85 wt % ethyl acetate and methyl ethyl ketone, and stirred. A copper foil of 12 mm in thickness with a roughed surface was coated with this solution at a thickness of 90 mm. This was dried to room temperature until the surface became gray in color, then dried at 110° C. This film was cut to make a 1.5 cm×2.0 cm negative electrode.

EXAMPLE 30

Premixed 91.5 weight parts of $LiMn_2O_2$ of 15 mm in average molecular diameter, 1 weight parts of acetylene black and 5.5 weight parts of black graphite powder were mixed and stirred with a solution made by dissolving 2 weight parts of the same copolymer as in Example 20 into 41 weight parts of ethyl acetate and 4 weight parts of methyl isobutyl ketone. A 35 mm mesh aluminum foil was coated with this solution at a thickness of 110 mm. This was dried at room temperature until the surface became gray in color, then dried at 110° C. Then, this film was cut to make a 1.5 cm×2.0 cm positive electrode.

COMPARATIVE EXAMPLE 10

96 weight parts of the premixed $LiCoO_2$, acetylene black and black graphite powder, the same as in Example 10, was mixed and stirred with 4 weight parts of polyvinylidene and 96 weight parts of N-methyl-2-pyrrolidione. This solution was applied onto 15 mm aluminum foil of rough surface using a doctor blade, and dried in a dryer at 160° C. The film thickness was 130 mm. This film was cut to make a 1.5 cm ×2.0 cm positive electrode.

COMPARATIVE EXAMPLE 20

96 weight parts of needle coke same as in Example 20 was mixed and stirred with a pro-dissolved solution of 4 wt % poly vinylidene and 96 weight parts of N-methyl-2-pyrrolidione. This solution was applied as a 90 mm thick film onto 12 mm thick copper foil of rough surface, and dried in a dryer at 160° C. This film was cut to make a 1.5 cm×2.0 cm negative electrode. An ethyl methyl carbonate-ethylene carbonate (volume ratio 3:1) battery was made with a counter electrode made of copper net with a lithium metal foil compressed, all used in Examples 10, 20 and 30 and Comparative Examples 10 and 20, with a separator consisting of bonded film (25 mm) of porous polyethylene and polypropylene and a 1M $LiPF_6$ electrolyte. Over-voltage of this battery was measured at 3 mA (current density of 1 ma/cm$^2$). The results are shown in Table 2.

TABLE 2

| | Binder | Battery Active Material | Over-Voltage |
| --- | --- | --- | --- |
| Example 10 | Propylene, tetrafluoroethylene vinylidene fluoride copolymer | $LiCOO_2$ | 0.04 |
| Example 20 | Propylene, tetrafluoroethylene copolymer | Needle Coke | 0.03 |
| Example 30 | Propylene, tetrafluoroethylene copolymer | $LiMn_2O_4$ | 0.03 |
| Comp. Example 10 | Polyvinylidene fluoride | $LiCoO_2$ | 0.13 |
| Comp. Example 20 | Polyvinylidene fluoride | Needle Coke | 0.1 |

Effectiveness of the Invention

The electrodes of the subject invention have small over-voltage as shown in Table 2. The copolymer of the subject invention used as the binder enables us to prepare a coating material for electrodes with general-purpose ethyl acetate as a solvent, thus provides a highly practical nonaqueous secondary battery.

What is claimed is:

1. A coating paste for an electrode characterized by an aqueous dispersible material comprising:

98.5–85 wt % of a battery active material;

0.1–13 wt % of a propylene-containing fluoropolymer selected from the group consisting of:
   a copolymer of propylene and tetrafluoroethylene;
   a terpolymer of propylene, tetrafluoroethylene and vinylidene fluoride;
   and mixtures thereof;

0.2–2 wt % of a carboxymethyl cellulose group;

and 0–1.0 wt % of a polyacrylic group.

2. A coating paste of claim 1 wherein the battery active material is selected from the group consisting of $MnO_2$; $V_2O_5$; $V_5O_{13}$; $TiS_2$; $MoS_2$; FeS; $LiCoO_2$; $LiMn_2O_4$; lithium composite metal oxides having a transition metal selected from the group consisting of Ni, Mn, Fe, and Ti; coke; graphite; mesophase pitch; and materials carbonized from phenol resin, polyparaphenylene, or carbon fiber.

3. The coating paste of claim 1 wherein the average particle size of the battery active material is between 1 and 50 μm.

4. The coating paste of claim 3 wherein the average particle size of the battery active material is between 3 and 20 μm.

5. The coating paste of claim 2 wherein the propylene-containing fluoropolymer is a copolymer of propylene and tetrafluoroethylene.

6. The coating paste of claim 1 wherein the propylene-containing fluropolymer is a terpolymer of propylene, tetrafluorethylene and vinylidene fluoride.

7. The coating paste of claim 5 wherein the propylene-containing fluoropolymer also contains a terpolymer of propylene, tetrafluorethylene and vinylidene fluoride.

8. A non-aqueous battery electrode, characterized by an aqueous dispersible material containing:

98.5–85 wt % of a battery active material;

0.1–13 wt % of a propylene-containing fluoropolymer selected from the group consisting of:
   a copolymer of propylene and tetrafluoroethylene;
   a terpolymer of propylene, tetrafluoroethylene and vinylidene fluoride;
   and mixtures thereof;

0.2–2 wt % of a carboxymethyl cellulose group;

and 0–1.0 wt % of a polyacrylic group.

9. The nonaqueous battery electrode of claim 8 wherein the battery active material is selected from the group consisting of $MnO_2$; $V_2O_5$; $V_5O_3$; $TiS_2$; $MoS_2$; FeS; $LiCoO_2$; $LiMn_2O_4$; lithium composite metal oxides having a transition metal selected from the group consisting of Ni, Mn, Fe, and Ti; coke; graphite; mesophase pitch; and materials carbonized from phenol resin, polyparaphenylene, or carbon fiber.

10. The nonaqueous battery electrode of claim 8 wherein the average particle size of the battery active material is between 1 and 50 μm.

11. The nonaqueous battery electrode of claim 8 wherein the average particle size of the battery active material is between 3 and 20 μm.

12. The nonaqueous battery electrode of claim 8 wherein the propylene-containing fluoropolymer is a copolymer of propylene and tetrafluoroethylene.

13. The nonaqueous battery electrode of claim 8 wherein the propylene-containing fluoropolymer also contains a terpolymer of propylene, tetrafluoroethylene, and vinylidene fluoride.

14. A nonaqueous battery electrode characterized by the electrode comprising battery active material, a binder and a metal foil, wherein the binder is selected from the group consisting of a copolymer of propylene and tetrafluoroethylene; a terpolymer of propylene, tetrafluoroethylene and vinylidene fluoride; and mixtures thereof.

15. The nonaqueous battery electrode of claim 14 wherein the battery active material is selected from the group consisting of $MnO_2$; $V_2O_5$; $V_5O_{13}$; $TiS_2$; $MoS_2$; FeS; $LiCoO_2$; $LiMn_2O_4$; lithium composite metal oxides having a transition metal selected from the group consisting of Ni, Mn, Fe, and Ti; coke; graphite; mesophase pitch; and materials carbonized from phenol resin, polyparaphenylene, or carbon fiber.

16. The nonaqueous battery electrode of claim 14 wherein the metal foil is selected from the group consisting of aluminum, nickel, stainless steel, and copper.

17. The nonaqueous battery electrode of claim 16, wherein the thickness of the metal foil is between 1 μm and 100 μm.

18. The nonaqueous battery electrode of claim 14 wherein the weight of the binder is between 1 and 20 percent weight parts based on 100 weight parts of battery active material.

19. The nonaqueous battery electrode of claim 14 wherein the binder is a copolymer of propylene and tetrafluoroethylene.

20. The nonaqueous battery electrode of claim 14 wherein the binder is a terpolymer of propylene, tetrafluoroethylene and vinylidene fluoride.

* * * * *